United States Patent [19]

Henricksen

[11] 4,130,023
[45] Dec. 19, 1978

[54] METHOD AND APPARATUS FOR TESTING AND EVALUATING LOUDSPEAKER PERFORMANCE

[75] Inventor: Clifford A. Henricksen, Yorba Linda, Calif.

[73] Assignee: Altec Corporation, Anaheim, Calif.

[21] Appl. No.: 864,738

[22] Filed: Dec. 27, 1977

[51] Int. Cl.$^2$ .......................................... G01M 19/00
[52] U.S. Cl. ....................................................... 73/647
[58] Field of Search .................... 73/647, 646, 645; 179/175; 340/16 R

[56] References Cited

U.S. PATENT DOCUMENTS

| 2,834,236 | 5/1958 | Pardue et al. .......................... 73/647 |
| 2,982,942 | 5/1961 | White .................................. 73/645 X |

*Primary Examiner*—Jerry W. Myracle
*Attorney, Agent, or Firm*—Edward A. Sokolski

[57] ABSTRACT

A method and apparatus for determining the directivity index (DI) and directivity factor (Q) of a loudspeaker is described. A microphone is placed in the throat of a horn-type loudspeaker to measure the acoustical pressure at this point. A second microphone is placed along an extension of a central axis of a loudspeaker at a predetermined distance from the mouth of the loudspeaker to measure the acoustical pressure at this point. The output of each of the microphones is rectified and converted to decibel form. The decibel signal representing acoustical pressure at the throat is subtracted from the signal representing the measured pressure at the predetermined distance. A signal (in decibel form) representing the distance of the second microphone from the mouth of the horn is added to the difference signal and a signal (in decibel form) in accordance with the diameter of the loudspeaker throat is subtracted from the difference signal to provide a signal in accordance with directivity index. From the directivity index a signal in accordance with directivity factor (Q), which is a power ratio, can be derived.

9 Claims, 2 Drawing Figures

METHOD AND APPARATUS FOR TESTING AND EVALUATING LOUDSPEAKER PERFORMANCE

This invention relates to the testing and evaluation of loudspeakers, and more particularly to such a method and apparatus by means of which directivity index (DI) and directivity factor (Q) can be determined.

In the testing and evaluation of loudspeakers, particularly those of the horn-drive type, the directivity index (DI) and directivity factor (Q) are generally determined and their values employed in evaluating the characteristics of the loudspeaker. The directivity factor (Q) is defined as the ratio between the square of the on-axis pressure at a predetermined distance from the mouth of the speaker and the square of the on-axis pressure at the same predetermined distance from the mouth of the speaker, assuming the speaker to be an isotropic radiator (this being a power ratio. The directivity index can be defined as the difference in decibels between the pressure measured "on-axis" at a predetermined distance from the mouth of the speaker and the pressure at this same distance, were the speaker to be isotropically radiating the same acoustic power (i.e., if the speaker had a perfect spherical radiation pattern).

In the prior art, the actual on-axis pressure is readily measured by using a microphone placed at the predetermined distance from the loudspeaker mouth along an extension of the central axis of the speaker. It is not however as simple under prior art techniques to determine what the acoustical pressure would be at this distance were the speaker an isotropic radiator. Typically, this parameter is determined by making vertical and horizontal polar plots at a particular frequency or band of noise, calculating the total acoustic power by integrating the apparent acoustic powers every five or ten degrees on the two polar plots and then calculating a mean value from these readings. This, of course, is a somewhat laborious procedure, and in view of the fact that evaluations are for practical considerations made for only five or ten degrees on the polar curves, accuracy is somewhat limited. Further, where rectangular mouth speakers having asymmetric polar patterns are involved, the accuracy of the calculations leaves much to be desired.

The method and apparatus of the present invention obviates the need for calculating the total acoustical output of the loudspeaker through the use of polar plots, and rather provides means for simultaneously directly measuring a parameter of which the total acoustical output is a function and the on-axis acoustical pressure at a predetermined distance, and from these measurements in conjunction with a few simple calculations, determining directivity index and directivity factor. This end result is achieved in a relatively simple straightforward manner to provide a marked improvement in the accuracy of the measurements, and at the same time greatly facilitating the making of such measurements.

It is therefore an object of this invention to simplify the making of directivity index measurements in the evaluation of loudspeakers.

It is a further object of this invention to enable an improvement in the accuracy of directivity index measurements in the evaluation of loudspeakers.

Other objects of this invention will become apparent as the description proceeds in connection with the accompanying drawings, of which:

Briefly described, the method and apparatus of the invention is as follows:

A first microphone is mounted in the throat of a horn-type loudspeaker to provide an output in accordance with the throat pressure of the horn. A second microphone is placed along an extension of the central axis of the speaker at a predetermined distance from the mouth thereof, and provides an output in accordance with the acoustical pressure at this distance from the speaker. The two microphone outputs are each rectified, converted to decibel form, and the output representing throat pressure is subtracted from the output representing pressure at said predetermined distance. To this difference signal, a signal representing the distance of the second microphone from the mouth of the loudspeaker is added and a signal representing the diameter of the throat of the microphone is subtracted, thus accounting for the area of the throat of the horn to determine the total acoustical power at the throat ($W_T$) and accounting for the distance (R) of the second microphone from the loudspeaker in determining on-axis speaker power. The resultant output signal represents the directivity index of the speaker which can be converted to directivity factor Q, by calculating the antilog thereof (and dividing by ten).

Let us first consider the various parameters involved in implementing the present invention.

It can be shown that acoustic throat power, $W_T$, can be found as follows:

$$W_T = \frac{\pi D_T^2 P_T^2}{4\rho o c} \tag{1}$$

where $P_T$ is the throat pressure at any frequency, $D_T$ is the throat diameter and $\rho o c$ is a constant for air.

If the throat power, $W_T$, were to be radiated isotropically, (i.e., equally in all directions) then at a distance, R, from the horn, the on-axis pressure, $P_R$ at that distance could be found as follows:

$$W_T = \frac{P_R^2(4\pi R^2)}{\rho o c} = \frac{\pi D_T^2 P_T^2}{4\rho o c} \text{ (from equation (1))} \tag{2}$$

and solving for $P_R$ we find:

$$P_R = \frac{D_T P_T}{4R} \tag{3}$$

Directivity factor, Q, which is the ratio between the on-axis power actually measured at the predetermined distance and the power which would be present at this distance were the source to have a perfect spherical radiation pattern, is as follows:

$$Q = \frac{P_O^2}{P_R^2} \tag{4}$$

where $P_O$ is the actual measured on-axis pressure at the predetermined distance.

It is to be noted that where the power is radiated isotropically, we find by substituting for the value of $P_R$ given in Equation (3) in Equation (4) that:

$$Q = \frac{P_O^2}{P_T^2} \cdot \frac{16R^2}{D_T^2} \quad (5)$$

As already noted, DI = 10 log (Q). It thus can be shown that:

$$DI = 20 \log (P_O/P_T) + 20 \log (4R/D_T) \quad (6)$$

and $$DI = 20 \log (P_O) - 20 \log (P_T) + 20 \log (4R) - 20 \log (D_T) \quad (7)$$

Figure 1:
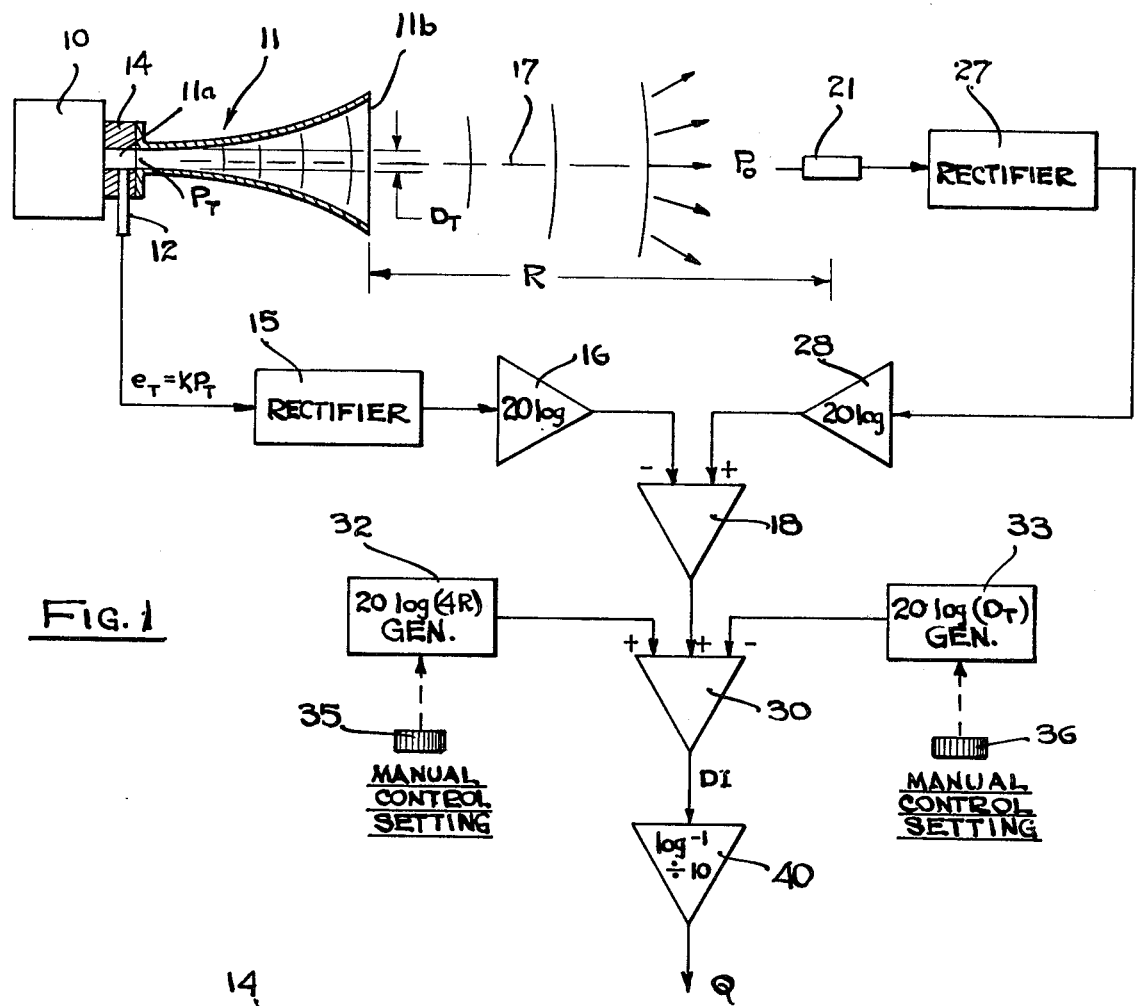
FIG. 1 is a schematic diagram of a preferred embodiment of the invention.

Referring now to FIG. 1, a preferred embodiment of the invention for implementing equation (7) in determining DI and Q is shown. Horn type loudspeaker 11 is acoustically driven by driver 10. The horn has a throat diameter, $D_T$ as shown in the Figure. A microphone 12 is supported at the throat 11a of the speaker by means of adapter 14, this adapter being illustrated in FIG. 2 and described more particularly further on in the specification. Suffice it to say at this point that microphone 12 is mounted so that it will sense the acoustical pressure, $P_T$ at the throat of the horn. Thus, the output of microphone 12 is a voltage, $e_t$, which is a function of the acoustical pressure $P_T$ at the throat of the horn. The output of microphone 12 is rectified by means of rectifier 15 and fed to logarithmic amplifier 16 which generates an output in accordance with 20 times the logarithm of the signals fed thereto, thus converting the signal to decibel form. The output of amplifier 16 is fed to differential amplifier 18.

Microphone 21 is placed along an extension 17 of the central axis of loudspeaker 11 at a predetermined distance, R, from the mouth 11b of the speaker. The output of microphone 21 is rectified by means of rectifier 27 and fed to logarithmic amplifier 28 which provides an output in accordance with 20 times the logarithm of the signal received thereby, the signal thus being converted to decibel form. The output of logarithmic amplifier 28 is fed to differential amplifier 18 wherein the output of logarithmic amplifier 16 is subtracted from the output of logarithmic amplifier 28. The output of amplifier 18 is fed to summing amplifier 30. Summing amplifier 30 also receives a signal in accordance with 20 times the logarithm of "4R"(distance of microphone 21 from the mouth of the loudspeaker) and a signal in accordance with 20 times the logarithm of $D_T$ (the diameter of the loudspeaker throat). These two signals are received from generators 32 and 33 respectively, the output of generator 32 being fed in positive polarity to amplifier 30, while the output of generator 33 is fed in negative polarity to this amplifier. The signal provided by generator 32 is manually set by means of manual control setting 35, while the signal provided by generator 33 is determined by manual control setting 36, these two parameters, of course, being predetermined in value for each loudspeaker under evaluation. The output of amplifier 30 represents the directivity index for the signal fed to the loudspeaker.

Thus, an output in accordance with directivity index (in decibels) over a desired frequency spectrum can be determined by employing the present invention in conjunction with conventional frequency response measuring equipment, such as Model 3306 frequency response measuring equipment manufactured by Bruel and Kjoer, Copenhagen, Denmark. These measurements are thus made directly, without the need for calculations or readings taken at five or ten degree intervals in vertical and horizontal polar runs.

The output of amplifier 30 can be converted from directivity index (DI) to directivity factor (Q) by an anti-log amplifier 40 which also divides the signal by a factor of 10.

Figure 2:
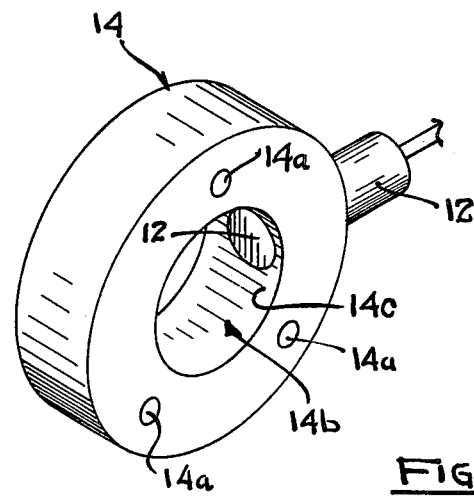
FIG. 2 is a perspective drawing illustrating a throat adapter which may be utilized in mounting a microphone in the throat of a horn-type loudspeaker for making one of the measurements required in implementing the invention.

Referring now to FIG. 2, an adapter 14 which can be used for mounting microphone 12 in the throat of a loudspeaker is shown. Adapter 14 is in the form of a ring and is constructed so that it can readily be fitted between driver 10 and horn 11 with the mounting bolts for attaching the horn to the driver being fitted through apertures 14a in the adapter, so that the adapter is clamped between the driver and the horn. The adapter has a circular aperture 14b which has the same diameter as that of the throat of the horn. Microphone 12 is mounted in the wall of the adapter with its face flush with the inside ring shaped adapter wall 14c. The microphone should preferably be one having relatively stiff characteristics such as a suitable condenser microphone.

While the invention has been described and illustrated in detail, it is to be clearly understood that this is intended by way of illustration and example only and is not to be taken by way of limitation, the spirit and scope of the invention being limited only by the terms of the following claims.

I claim:

1. Apparatus for determining the directivity index of a loudspeaker having a throat comprising:
    means for generating a first electrical signal representing the acoustical pressure ($P_T$) at the throat of the loudspeaker,
    means for generating a second electrical signal representing the acoustical pressure ($P_O$) at a predetermined distance (R) from the mouth of the loudspeaker, and
    means for generating an output signal which is in accordance with the ratio between the second and first signals and modified by a factor in accordance with said predetermined distance (R) divided by the diameter ($D_T$) of the loudspeaker throat, said output signal representing the loudspeaker directivity index.

2. The apparatus of claim 1 wherein the means for generating an electrical signal representing the acoustical pressure at the throat of the loudspeaker comprises a microphone and adapter means for supporting the microphone at the loudspeaker throat.

3. The apparatus of claim 2 wherein the loudspeaker is of the horn type and includes a driver for driving said horn, said adapter being mounted between the throat of the horn and the driver.

4. The apparatus of claim 3 wherein the adapter is ring shaped and has a circular aperture having substantially the same diameter as the throat of the horn, said circular aperture being aligned with the throat of the horn.

5. Apparatus for determining the directivity index (DI) of a loudspeaker comprising:
    means for generating an electrical signal representing the acoustical pressure ($P_T$) at the throat of the loudspeaker, means for generating an electrical signal representing the on-axis acoustical pressure ($P_O$) of the loudspeaker output at a predetermined distance (R) from the loudspeaker, means for converting each of said electrical signals to logarithmic form, means for subtracting the logarithmic signal representing throat pressure ($P_T$) from the logarithmic signal representing on-axis acoustical pressure ($P_O$), means for generating a logarithmic signal representing said predetermined distance (R), means for generating a logarithmic signal representing the area of the loudspeaker throat, and means for adding the distance signal to and subtracting the signal representing the throat area of the loudspeaker from the output of said first mentioned subtracting means to provide a signal representing the directivity index of the loudspeaker.

6. A method for determining the directivity characteristics of a loudspeaker having a throat comprising the steps of:

generating a first electrical signal representing the acoustical pressure ($P_T$) at the throat of the loudspeaker, generating a second electrical signal representing the on-axis acoustical pressure ($P_O$) of the loudspeaker at a predetermined distance (R) from the mouth thereof, generating a third electrical signal in accordance with the ratio between said second and first signals, and generating a fourth electrical signal which is in accordance with the third signal multiplied by a factor in accordance with said predetermined distance (R) divided by the value of the diameter ($D_T$) of the loudspeaker throat, said fourth signal representing the directivity index of the loudspeaker.

7. The method of claim 6 wherein the third and fourth signals are generated in decibel form.

8. The method of claim 7 and further including the step of generating a fifth signal representing directivity factor (Q) by converting said fourth signal to a signal which is the anti-log thereof and dividing the anti-log signal by a factor of 10.

9. The method of claim 7 wherein said fourth signal is generated by manually setting first and second generators to provide outputs representing 20 log (4R) and 20 log ($D_T$) respectively, the output of said first signal generator being added to said third signal and the output of said second signal generator being subtracted from said third signal.

* * * * *